United States Patent
Moradmand et al.

(10) Patent No.: US 6,668,986 B2
(45) Date of Patent: Dec. 30, 2003

(54) ACTIVE HYDRAULIC FLUID VEHICULAR SUSPENSION DAMPER

(75) Inventors: Jamshid Kargar Moradmand, Dayton, OH (US); Robert Alan Neal, Dayton, OH (US); Darin Duane Dellinger, Tipp City, OH (US)

(73) Assignee: Delphi Technologies, Inc., Troy, MI (US)

( * ) Notice: Subject to any disclaimer, the term of this patent is extended or adjusted under 35 U.S.C. 154(b) by 22 days.

(21) Appl. No.: 10/042,970

(22) Filed: Jan. 8, 2002

(65) Prior Publication Data

US 2003/0127294 A1 Jul. 10, 2003

(51) Int. Cl.⁷ ................................................. F16F 15/03
(52) U.S. Cl. ................. 188/267; 188/266.2; 188/282.2; 188/282.5; 188/313; 188/322.15
(58) Field of Search ............................... 188/267, 267.2, 188/266.1, 266.2, 282.1, 282.2, 282.5, 313, 322.15, 322.13

(56) References Cited

U.S. PATENT DOCUMENTS

| | | | | |
|---|---|---|---|---|
| 4,854,429 A | * | 8/1989 | Casey ..................... | 188/266.2 |
| 5,078,240 A | * | 1/1992 | Ackermann et al. ........ | 188/285 |
| 5,368,142 A | * | 11/1994 | Ashiba et al. ............ | 188/282.1 |
| 5,392,883 A | * | 2/1995 | Huang et al. ............ | 188/282.3 |
| 5,409,088 A | * | 4/1995 | Sonsterod ............... | 188/282.3 |
| 5,522,484 A | * | 6/1996 | Sawai ..................... | 188/282.2 |
| 5,690,195 A | * | 11/1997 | Kruckemeyer et al. .. | 188/282.5 |
| 5,706,919 A | | 1/1998 | Kruckemyer et al. | |
| 5,810,127 A | * | 9/1998 | Schmidt ................. | 188/282.2 |
| 5,833,037 A | * | 11/1998 | Preukschat .............. | 188/299.1 |
| 6,003,644 A | * | 12/1999 | Tanaka ................... | 188/266.5 |
| 6,119,831 A | * | 9/2000 | Knecht et al. ........... | 188/282.2 |
| 6,202,805 B1 | * | 3/2001 | Okada et al. ............ | 188/266.2 |
| 6,273,224 B1 | * | 8/2001 | Achmad ................. | 188/282.3 |
| 6,343,676 B1 | * | 2/2002 | Achmad ................. | 188/299.1 |
| 6,371,262 B1 | * | 4/2002 | Katou et al. ............. | 188/266.5 |
| 6,374,967 B2 | * | 4/2002 | Matsumoto et al. ........ | 188/280 |
| 6,422,360 B1 | * | 7/2002 | Oliver et al. ............ | 188/266.5 |
| 6,491,145 B2 | * | 12/2002 | Adamek et al. .......... | 188/282.2 |
| 2001/0002639 A1 | * | 6/2001 | Nezu ....................... | 188/319.1 |
| 2001/0035317 A1 | * | 11/2001 | Sakai et al. .............. | 188/266.2 |
| 2002/0121415 A1 | * | 9/2002 | Hartel ..................... | 188/282.2 |

* cited by examiner

*Primary Examiner*—Christopher P. Schwartz
*Assistant Examiner*—Devon Kramer
(74) *Attorney, Agent, or Firm*—Scott A. McBain

(57) ABSTRACT

A vehicular damper includes a cylinder, a piston rod in the cylinder having a hollow end defining an axial rod passage and a cylindrical piston affixed to the end of the rod dividing the cylinder into a compression chamber and a rebound chamber. A valve plate on the rod adjacent the piston has a plurality of soft channels extending from an outer end at the rebound chamber to an inner end at the axial rod passage and a solenoid actuated cylinder in the rod passage is movable to open and close the inner ends of the soft channels. A bi-directional working disc contacts with the soft channels' outer ends to provide damping in rebound and compression when the solenoid valve is open. In contrast, the piston has a plurality of firm rebound channels and a like plurality of firm compression channels extending therethrough with a uni-directional rebound working disc in valve contact with the outlet of the rebound chambers and a uni-directional compression working disc in valve contact with the outlet of the compression chambers. The damper provides valved parallel flow between compression and rebound chambers through the soft channels and through the firm channels with independent spring rate control through the firm rebound and compression channels.

28 Claims, 4 Drawing Sheets

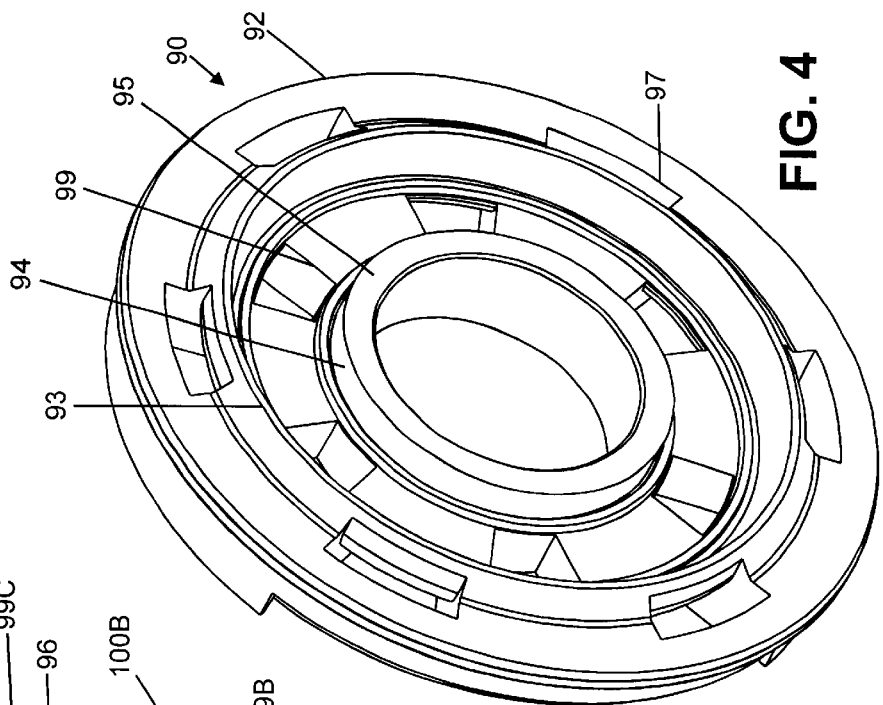
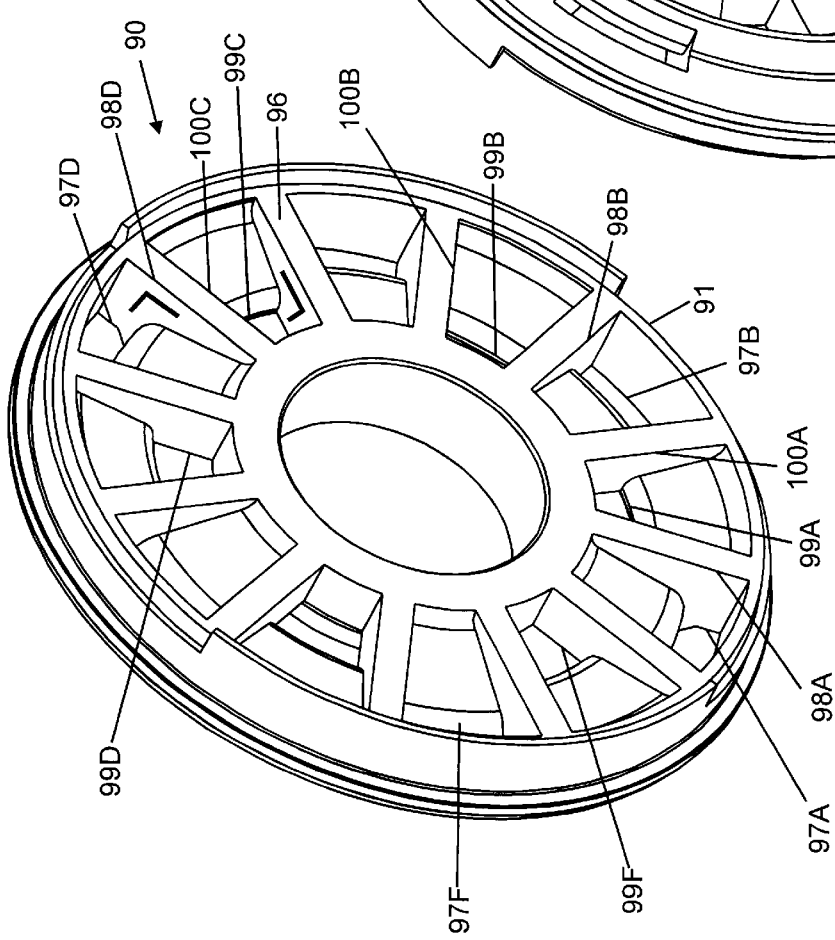

ACTIVE HYDRAULIC FLUID VEHICULAR SUSPENSION DAMPER

TECHNICAL FIELD

This invention relates generally to fluid dampers for vehicles and more particularly, to dampers of the type which are known as "active".

The invention is specifically applicable to and will be described with particular reference to a mono-tube shock absorber or strut which is electrically controlled to function with two different damping characteristics. However, those skilled in the art will recognize that the invention is also applicable to twin tube shock absorbers and struts and, in theory, may be applicable to dampers having variable damping rates.

BACKGROUND OF THE INVENTION

The typical fluid dampers used in vehicle suspensions, such as hydraulic shock absorbers and struts, filter out road inputs from being transferred to the vehicle's body and associated passenger compartment by dissipating energy. Two common types of vehicle fluid dampers, each having a cylinder and piston, are mono-tube and twin tube shock absorbers. The preferred embodiment of this invention is directed to mono-tube shock absorbers and struts.

As is well known, a mono-tube shock absorber essentially comprises a cylinder or tube filled with hydraulic fluid and into which extends a piston rod having a piston fixed to its end. Generally, the upper end of the piston rod extending out of the tube is adapted for connection to the sprung mass (body) of a motor vehicle and the lower end of the tube or cylinder is connected to the unsprung mass (wheel assembly) of the vehicle. Relative movement of the sprung and unsprung masses of the vehicle produces relative axial movement of the piston which is in sealing sliding engagement with the tube walls and divides the tube into two chambers, conventionally referred to as a rebound chamber on one side of the piston and a compression chamber on the opposite side.

Relative movement of the piston within the cylinder is provided by valving that controls fluid flow from the pressurized chamber past or through the piston to the unpressurized chamber. Two of the more common passive types of valves used in fluid dampers are deflected disc type valves (digressive valves) and blow-off type valves. With a deflected disc valve, a disc stack is positioned as an obstruction in a fluid flow path. During piston movement, once sufficient pressure is developed, the disc stack is deflected to provide an increased flow area. The extent to which the disc stack resists deflection principally determines the damping characteristics of the fluid damper. In a blow-off valve, a single valve disc is generally biased by a spring to normally close-off a fluid flow passage. Sufficient fluid pressure causes the valve to lift, compressing the spring and providing an increased fluid flow area. Different rate springs and preloads allow the valve to blow-off at different pressures thereby regulating damping loads. This invention relates to disc-type valves.

The ride handling characteristics of a damper for a motor vehicle (load vs velocity performance curve) is determined by the rebound and compression characteristics of the piston valve in a passive mono-tube application. However, it is desirable to have at least a two stage damper for both rebound and compression. For example, during vehicle cornering maneuvers in which the piston undergoes low speed compression, it is desirable for the vehicle to have stiff or "firm" ride handling characteristics. Conversely, when the vehicle travels over pot holes at relatively high vehicle speeds in which the piston undergoes high speed compression, it is desirable to have "soft" ride handling characteristics. Different vehicles require different handling characteristics. Conventional mono-tube shock absorbers with passive valves can only affect a compromise.

The prior art has long recognized this problem and has developed designs in which the valve orifice, which controls the damping forces, is electrically adjustable. Conceptually, sensors determine the operating condition of the vehicle and algorithms determine a desired orifice size based on the operating conditions. Electronics generate an orifice size signal inputted to electrical apparatus which mechanically adjusts the orifice size. While conceptually sound, there are problems in the commercial implementation of this concept.

The prior art has recognized such problems and has developed a solenoid actuated, shuttle type, shut-off valve. More particularly, an economical solenoid can be designed to fit into a piston rod and develop sufficient force to move a spring biased shuttle valve from an unenergized position to an energized position. A mono-tube piston can be equipped with two passive valves, each controlling rebound and compression, with one of the two valves selectively cut in or out of operation by the solenoid shuttle valve. For example, both valves operate to provide the soft suspension for highway cruising while only one valve operates to provide the stiff compression for cornering. The solenoid is actuated automatically by sensors sensing or predicting the operating conditions of the vehicle. Additionally, the vehicular operator can be provided with a manual override control that forces the solenoid into an energized or de-energized condition. This invention is applicable to this type of active damper and uses a solenoid to selectively cut in and out a passive valve.

Two-stage, solenoid operated active dampers are described in detail in U.S. Pat. No. 5,690,195 to Kruckemeyer et al., issued Nov. 25, 1997 and U.S. Pat. No. 5,706,919 to Kruckemeyer et al., issued Jan. 13, 1998. The '195 patent illustrates an arrangement where the hydraulic fluid passes in parallel to different valves and the '919 patent illustrates an arrangement where the hydraulic fluid passes serially through the two valves. This invention is an improvement over the '919 and '195 patents, specifically, the '195 parallel flow patent. The '195 patent is incorporated by reference herein, specifically for its disclosure of the solenoid, the solenoid actuated shuttle valve and the digressive disc stack valve working in conjunction with the solenoid which are substantially the same as that disclosed herein.

The '195 patent uses a bi-directional digressive disc stack valve for the passive valve which is always on and typically provides the firm ride handling characteristics of the vehicle. As is well known, bi-directional, digressive disc stack valves cannot provide independently set flow rates for both rebound and compression. Because this valve is normally used to provide the firm handling characteristics of the vehicle, it is highly desirable for the manufacturers, especially those manufacturing "performance" vehicles, to be able to independently set or tune the rebound and compression spring rates of this valve. This is not possible in the '195 patent.

A more subtle point is that a valve for the firm mode requires relatively high, unimpeded flow rates through the piston. That is, a valve always provides the flow restriction in a passage, i.e., the orifice. However, the passage upstream or downstream of the orifice affects flow through the orifice, i.e., a backpressure at certain flow rates can affect flow through the orifices. Again, the function of the firm valve is to assure high flow rates. Because bi-directional disc stack valves require flow in one direction to unseat the outer edge of the disc and opposite flow to unseat the inner edge of the disc, a serpentine flow path to the orifice often occurs. Such a flow path could adversely affect performance of the valve at certain conditions, i.e., high flow producing turbulence.

SUMMARY OF THE INVENTION

Accordingly, it is an important aspect of the invention to provide an improved, parallel flow active damper, especially suited for mono-tube applications, in which at least one of the parallel valves can independently control the flow rate through the damper for both rebound and compression damper modes.

In accordance with one aspect of the invention, a vehicular damper is provided which includes a cylinder and a piston rod in the cylinder having a hollow end defining an axial rod passage and the rod or cylinder moves relative to the other. A cylindrical piston is affixed to the end of the rod and divides the cylinder into a compression chamber and a rebound chamber. The piston has a plurality of firm rebound channels and a plurality of firm compression channels extending therethrough. A uni-directional rebound working disc is in valved contact with the outlet of the rebound channels and a uni-directional compression working disc is in valved contact with the outlet of the compression channels. A valve plate is provided on the rod adjacent the piston and has soft channels extending from an outer end at the rebound chamber to an inner end at the axial rod passage. A solenoid actuated cylinder is movable in the axial rod passage to open and close the inner ends of the soft channels. A bi-directional working disc is provided in valved contact with the soft channels' outer ends whereby valved parallel flow through the valve plate and piston occurs when the solenoid actuated cylinder opens the soft channels inner ends while the uni-directional discs independently control flow at all times through the firm rebound and compression channels.

In accordance with another aspect of the invention, the piston has a rebound face surface on one side and a compression face surface on the opposite side with a cylindrical rod opening extending therethrough. The rebound face surface has an annular compression valve seat extending therefrom and the compression face surface has an annular rebound valve seat extending therefrom. The rebound disc stack digressive valve includes at least an annular rebound uni-directional working disc and an annular rebound spacer disc with the rebound working disc having an outside diameter greater than the diameter of the rebound valve seat. Similarly, the compression disc stack digressive valve includes at least an annular compression uni-directional working disc and an annular compression spacer disc with the annular compression working disc having an outside diameter greater than the diameter of the compression valve seat. All the discs have substantially circular inside and outside diameters whereby the discs can be mounted at any angular orientation relative to the piston rod for simple assembly. In the preferred embodiment, the digressive valve disc stacks include rebound and compression orifice discs having annular bleed slots extending radially inward from the peripheral edge of the orifice disc. In addition, the disc stacks include annular preload/adjust rebound and compression discs. The orifice disc is between the working disc and valve seat and the preload/adjust disc is between the orifice disc and valve seat. The orifice disc and preload/adjust disc as well as any additional working disc and spacer disc have substantially circular outside and inside diameters void of any aligning notches or protrusions.

In accordance with another aspect of the invention, the piston is an assembly of first and second substantially identical, sintered metal cylindrical halves with each half having on one side a half face surface which is either the piston's rebound or compression face surface and an interior match face surface on its opposite side with the match surfaces in mating contact with one another to form the piston. Each half has i) on its half face surface, an annular valve seat protruding therefrom which is one of the firm rebound or compression valve seats, ii) a plurality of circumferentially spaced outer channels having outer end openings in the face surface spaced radially outward from the annular valve seat with each outer channel axially tapering in an "L" shaped configuration from the outer end face opening to a trapezoidal inner end opening in the match surface (the inner end opening being substantially larger than the outer end opening and radially extending from a position adjacent the rod opening to a position beyond the diameter of the annular valve seat) and iii) a plurality of circumferentially spaced inner channels having face end openings adjacent the half face surface spaced radially inward from the annular valve seat with each inner channel axially tapering in an "L" shaped configuration to a trapezoidal match end opening in the match surface. The inner channel match end opening is substantially larger than the inner channel face end opening and (like the outer channel's inner end opening) radially extends from a position adjacent the rod opening to a position beyond the diameter of the annular valve seat whereby the inner channels of one half mate with the outer channels of the opposite half to form one of the rebound and compression channels while the outer channels of the one half mate with the inner channels of the opposite half to form the other one of the rebound and compression channels. Importantly, the rebound and compression channels have increasing cross-sectional flow areas from the end openings of each channel minimizing any tendency towards turbulent flow or excessive backpressures at high flow rates through the piston. At the same time, the inner and outer channels can be easily formed as straight through passages when the metal (powder metal in the preferred embodiment) is sintered into final half piston form, a material known to those skilled in the art as not conducive to machining operations.

Another aspect of the invention is that an improved damper results with less cost than otherwise required to produce the damper. Specifically, the firm digressive rebound and compression disc stacks allow, as noted, independent control of damper flow in rebound and compression modes to improve damper performance while the rebound and compression disc stacks are free of any aligning notches or protuberances making assembly easier and reducing the time thereof. Additionally, the configuration of the firm rebound and compression channels is relatively easy to form in a sintered part (reducing the cost thereof while enhancing the characteristics of the fluid flow through the channel thereby improving valve performance.

These and other objects, features and advantages of the present invention will become apparent from the following Detailed Description of the Invention taken together with the accompanying drawings.

BRIEF DESCRIPTION OF THE DRAWINGS

The invention may take physical form in certain parts and arrangement of parts, a preferred embodiment of which will be described in detail herein and illustrated in the accompanying drawings which form a part hereof and wherein:

FIG. 3 is a pictorial view of the interior surface of a piston half;

FIG. 4 is a pictorial view of the outside or face surface of a piston half; and, FIG. 5 is a view identical to FIG. 1 but marked to show fluid flow paths through the damper.

DETAILED DESCRIPTION OF THE INVENTION

Figure 1:
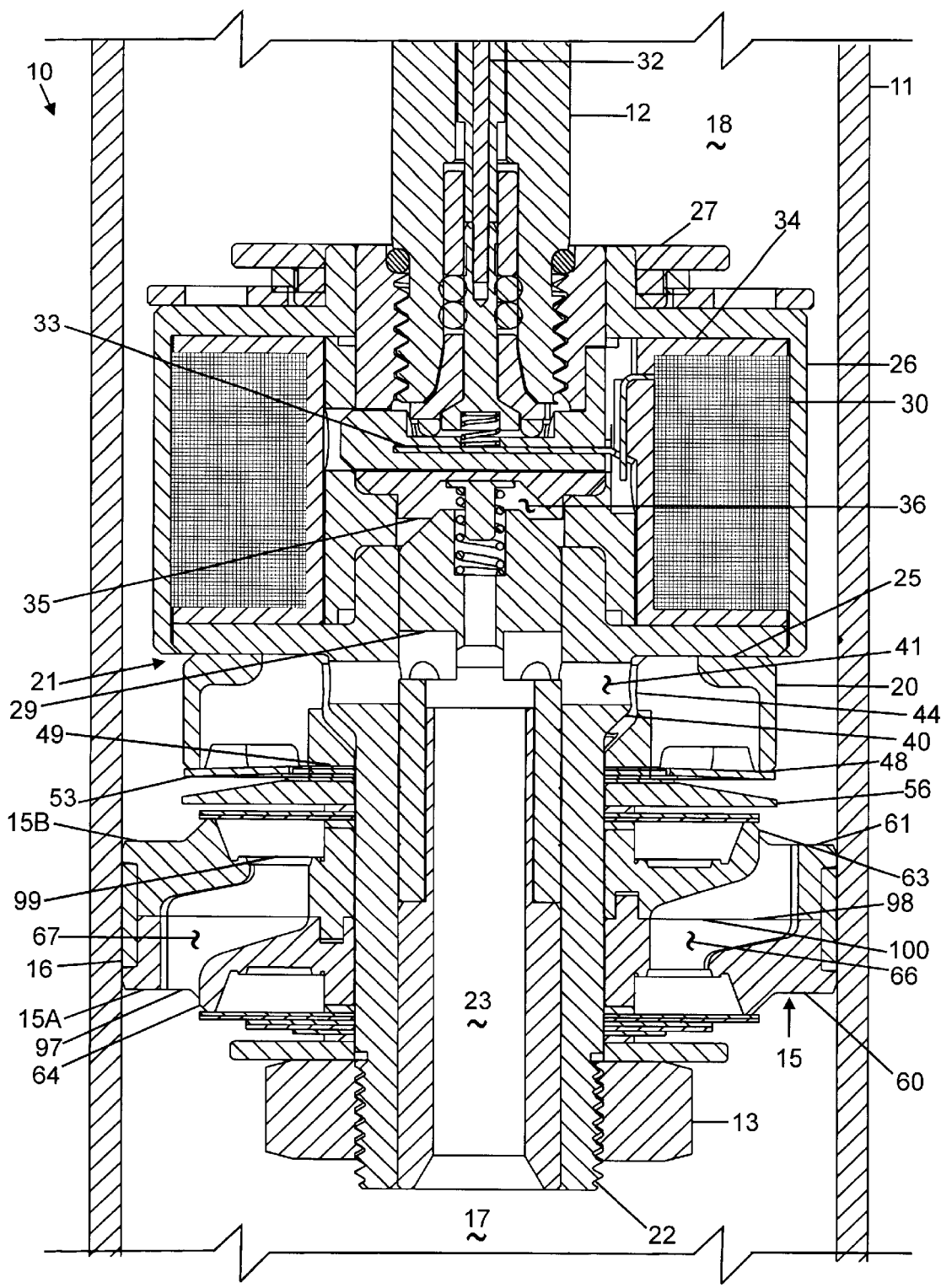
FIG. 1 is a partial, longitudinally extending, cross-sectioned view of a mono-tube fluid vehicle damper according to the present invention.

Referring now to the drawings wherein the showings are for the purpose of illustrating a preferred embodiment of the invention only and not for the purpose of limiting the same, there is shown in cross sectional view in FIG. 1 the valving portion of a hydraulic damper for a vehicle suspension, preferably a mono tube suspension damper embodied as a mono tube shock absorber 10. Shock absorber 10 includes a single cylinder or tube 11 which has a closed lower end (not shown) and an upper end closed by a conventional rod guide (also not illustrated). Within tube 11 is a piston rod 12, the upper end of which (not shown) extends in a sliding, sealing manner through the rod guide in a conventional manner. The bottom end of piston rod 12 contains a valve assembly comprising several valves which will be discussed below and the valve assembly is held in a tight assembled manner by piston nut 13 at the end of piston rod 12.

As is conventional (and thus not shown or described in detail), the upper end of piston rod 12 is adapted to be connected to the sprung mass (body) of a motor vehicle in a conventional manner. Similar means of attachment is provided at the lower end of tube 11 for attachment to the unsprung mass (wheel assembly) of the vehicle, also in a conventional manner. Relative movement between the sprung and unsprung masses of the vehicle, to which shock absorber 10 is connected, produces relative axial sliding movement of the piston valve assembly within tube 11.

The valve assembly includes a cylindrical piston 15 which in the preferred embodiment is an assembly comprised of two identical piston halves 15A, 15B. About the circumference of piston 15 is a seal 16 which maintains sealing contact with the inside of tube 11 as piston 15 slides relative to tube 11. Seal 16 divides the interior of tube 11 into a compression chamber 17 on one side of seal 16 and a rebound chamber 18 on the opposite side of seal 16.

The piston valve assembly, in addition to piston 15, includes a valve plate 20 which abuts, at one end, a flux plate 21.

Flux plate 21 has a bottom tubular portion 22 defining an open ended axial rod passage 23. Tubular portion 22 extends from an annular flux base 25 which in turn is crimped in a sealed manner to a solenoid cup 26. Solenoid cup 26 in turn is fixed in an immovable, sealed manner to a solenoid nut 27 which in turn threadingly engages the actual threaded end of piston rod 12 in a sealed manner i.e. O-rings. Tubular portion 22 of flux plate 21 can thus be viewed as an extension of the end of piston rod 12 and provides a hollow or axial rod passage 23, which as will be explained below, provides a fluid communication path between compression and rebound chambers 17, 18. For purposes of this invention axial rod passage 23 is to be viewed as either integrally formed within the end of piston rod 12 or, as shown in the preferred embodiment of FIG. 1, as an extension of piston rod 12 which extension is then the end of piston rod 12. Within rod passage 23 is a shuttle or solenoid cylinder valve 29.

Solenoid valve 29 is axially movable in rod passage 23 between a first position when solenoid coil 30 is not energized and a second position when solenoid coil 30 is energized. As will be explained below, when solenoid valve is at one of its positions fluid flow within rod passage 23 can occur (i.e., the preferred embodiment) and when solenoid valve 29 is at its other position, fluid flow cannot occur. In accordance with the invention the closed position of solenoid valve 29 can occur when solenoid coil 30 is activated or alternatively, the closed position can occur when solenoid coil 30 is not activated. An on/off solenoid actuated valve arrangement is used because, among other reasons, high pressures and fluid viscosity considerations require the solenoid to develop a significant force to move solenoid valve 29. Cost and size considerations in view of the current state of the solenoid art preclude commercial utilization of coils that can develop precise, progressive flux patterns that can variably position solenoid valve 29 in rod passage 23. If electrical coils, which can precisely position solenoid valve 29, become commercially available, the present invention would still be practiced and would not be obsolete because of its accurate control for firm damping.

Reference to Kruckemeyer et al., U.S. Pat. No. 5,690,195 can be had for a more detailed explanation of the operation of the solenoid than that presented herein. The solenoid arrangement illustrated in FIG. 1 is conceptually identical to that disclosed in the '195 patent. Generally, an insulated electrical lead 32 extends from outside shock absorber 10 through piston rod 12 and communicates with a contact 33 carried to coil 30 which has coil turns wound on a bobbin 34. The magnetic circuit includes a pole piece 35 and an air gap 36 between pole piece 35 and solenoid valve 29. Magnetic flux from coil 30 passes between pole piece 35 and solenoid valve 29 and the end of the solenoid valve is conical to establish a gradient reduction in axial magnetic flux as solenoid valve 29 moves away from pole piece 35. The on/off signal transmitted by electrical lead 32 can be generated either by an electronic control in a conventionally known manner or in response to manual selection by the operator as noted in the Background. Again, this aspect of the invention is conventional.

Figure 2:
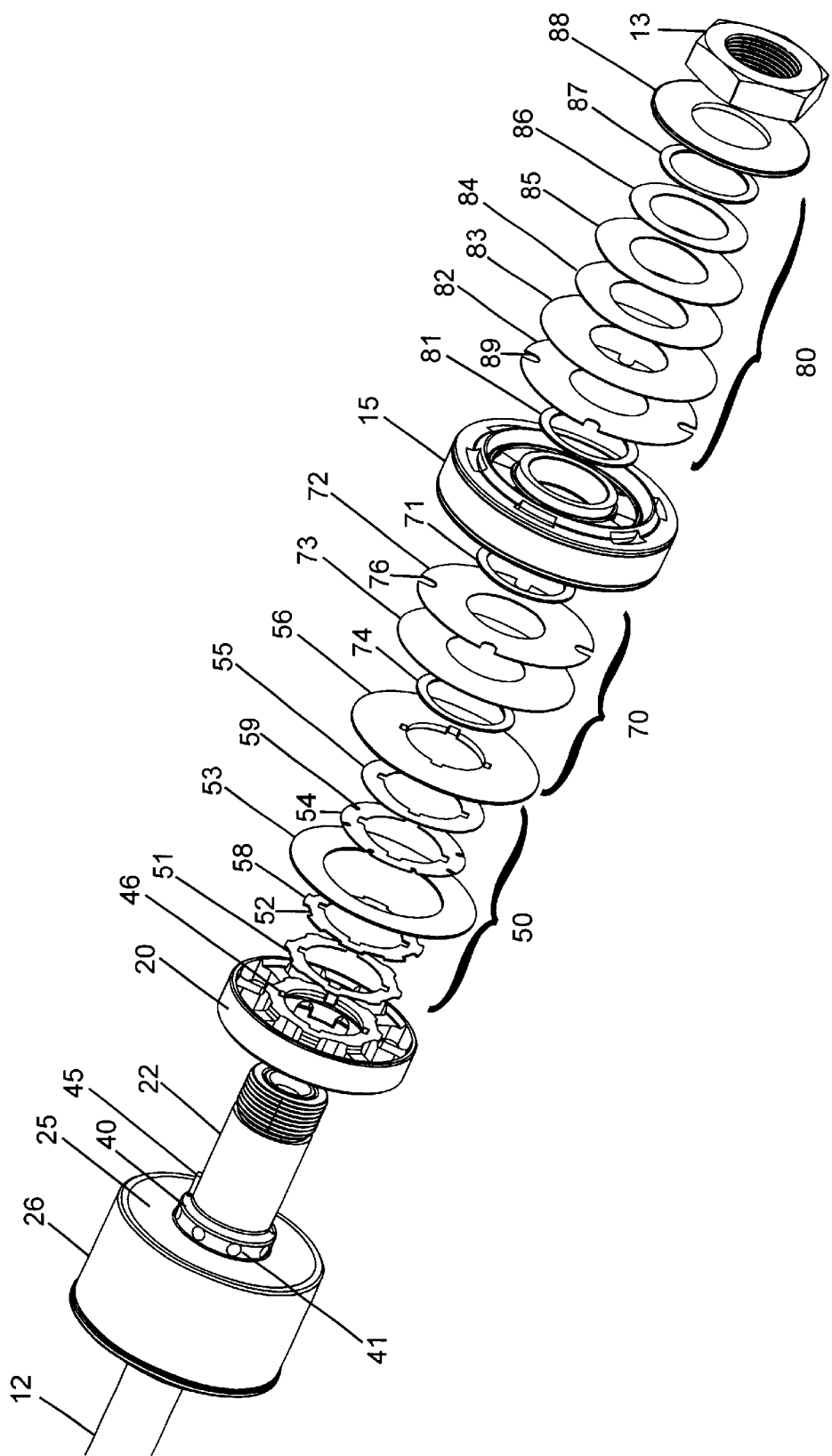
FIG. 2 is an exploded view of the damper valving shown in FIG. 1.

Tubular portion 22 of flux plate 21 has a hub section 40 adjacent annular flux space 25 and hub section 40 has a plurality of radial passages 41 circumferentially spaced thereabout as best shown in FIG. 2. Cylindrical valve plate 20 which in an assembled condition abuts annular flux base 25 has a plurality of soft channels 42 extending there through which in number equal radial passages 41. Each soft channel has a first end opening confronting or opening to rebound chamber 18 and a second end opening 44 which is adjacent to a corresponding radial passage 41. To assure alignment of soft channels 42 with radial passages 41, a spline 45 is provided on flux plate tubular portion 22 and spline 45 fits within one of several circumferentially spaced spline recesses 46 provided in the hub section opening of valve plate 20 as best shown in FIG. 2.

On the side of valve plate 20 which faces rebound chamber 18 and adjacent first opening of soft channels 42 is a circular soft valve seat 48 and adjacent the central opening in valve plate 20 is a cylindrical hub seat 49. A soft digressive valve disc stack 50 seats against soft valve seat 48 and followed by a similarly sized centering disc 52. After centering disc 52 is hub seat 49 to provide control valving of fluid flow through soft channels 42 either from rebound chamber 18 to compression chamber 17 or vice versa. In the preferred embodiment soft valve stack 50 as best shown in FIG. 2 includes a preload/adjust disc 51, indirectly against a mono tube working disc 53 in turn followed by an orifice disc 54 which in turn is followed by a clamp spacer disc 55 which abuts a retainer disc 56. Valve plate 20 is tooled or machined so that soft valve seat 48 extends axially beyond hub seat 49 (or hub seat 49 is recessed relative to soft valve seat 48) by a prescribed distance (preload amount) and preload/adjust disc 51 is provided to change or eliminate the amount of offset i.e. preload. It is to be appreciated that when soft valve stack 50 is assembled the discs abut each other from hub seat 49 so that the outer portion of mono tube working disc 53 deflects relative to its inner portion by a preset distance, i.e., the axial recess. The preload distance thus changes the opening pressure of mono tube working disc 53 and acts like a compressed coil spring so that the higher the preload, the higher the pressure has to be for the disc to open. The preload can be changed by changing the thickness and/or the number of preload/adjust discs and/or the diameter of the preload/adjust disc. It should be recognized that such changes also effects the rate of soft valve stack 50 and therefore effects the performance of soft valve stack 50 after the stack has been opened. As best shown in FIG. 2 preload/adjust disc 51 and centering disc 52 have circumferentially spaced centering tangs radially extending from the outer periphery of preload/adjust and centering disc 51, 52. Mono tube working disc 53 has an O.D. (outside diameter) which extends beyond outside soft valve seat 48 and an I.D. (inner diameter) which is slightly larger than the outside diameter of tangs 58 on centering disc 52. Orifice disc 54 has bleed channels 59 at its outer periphery which extend radially inward a distance equal to or greater than the I.D. of mono tube working disc 53. The surface of retainer disc 56 facing mono tube working disc 53 functions as a stop limiting deflection of mono tube working disc 53. Soft digressive valve stack 50 operates in a conventional manner. When the shock absorber moves in compression the outside diameter of mono tube working disc 53 deflects downwardly when viewed in FIG. 1. When the shock absorber moves in rebound the inside diameter of mono tube working disc 53 deflects upwardly from orifice disc 54 and clamp disc 55 when viewed in FIG. 1. Soft digressive valve stack 50 is conventional and reference to the '195 patent can be had for additional description. Note that all the discs in soft valve disc stack 50, with the exception of mono tube working disc 53, have splined recesses for receiving spline 45 and fixing the angular position of the disc.

Piston 15 is a cylinder having at one side a rebound face surface 60 defining a portion of a compression chamber 17 and on its opposite side a compression face surface 61 defining a portion of rebound chamber 18. A firm circular compression valve seat 63 is formed in compression face surface 61 and a similar firm circular rebound valve seat 64 is formed in rebound face surface 60. A plurality of circumferentially spaced rebound channels 66 extend through piston 15 and a like plurality of circumferentially spaced compression channels 67 likewise extend through piston 15 with compression channels 67 alternately spaced between rebound channels 66. Each compression channel 67 has an end opening adjacent compression chamber 17 and an opposite end opening adjacent compression valve seat 63. Similarly, each recess channel 66 has an end opening adjacent rebound chamber 18 and an opposite end opening adjacent rebound valve seat 64.

A firm digressive compression disc valve stack 70 is in valve contact with firm compression seat 63. In the preferred embodiment and as best shown in FIG. 2 firm digression compression valve stack 70 includes a compression preload/adjust disc 71 seated against compression face surface 61 followed by a compression orifice disc 72 which in turn is followed by compression working disc 73 followed by compression spacer disc 74 which abuts disc retainer 56. Compression preload/adjust disc 71 is sized and functions in the manner stated above. Compression working disc 73 has an outside diameter extending beyond the diameter of compression valve seat 63. Compression orifice disc 72 has approximately the same outside diameter as the O.D. of compression working disc 73 and includes bleed channels 76 which extend radially inward from the periphery of compression orifice disc 72 to a distance inside compression valve seat 63. When the shock absorber is in compression, compression working disc 73 and compression orifice disc 72 deflect upwardly off compression valve seat 63 when viewed in FIG. 1. Firm compression disc stack 70 does not deflect when shock absorber 10 is in rebound.

Adjacent rebound face surface 60 in contact with rebound valve seat 64 is a firm digressive rebound disc stack 80, best shown in FIG. 2. Rebound stack 80 includes a rebound preload/adjust disc 81 in contact with the hub portion of piston 15. In contact with rebound preload/adjust disc 81 is a larger rebound orifice disc 82 and in contact with rebound orifice disc 82 is a similarly sized rebound working disc 83. There are additional rebound working discs designated by reference numerals 84, 85 and 86. The additional working discs have varying O.D.s and thicknesses to establish a preset spring rate. Adjacent last additional working disc 86 is a rebound clamp/spacer disc 87 which in turn abuts a rebound retainer/stop disc 88 which in turn is held by piston rod nut 13. Rebound orifice disc 82 has at least one bleed channel 89 extending radially inward from its peripheral edge to a position inward of rebound valve seat 64. When shock absorber 10 is in rebound, rebound orifice disc 82 and rebound working discs 83-86 deflect downward when viewed in FIG. 1.

It is appreciated that when shock absorber 10 is assembled valve plate 20, soft valve disc stack 50, firm compression disc stack 70, piston 15 and firm rebound stack 80 are assembled onto the axial end of piston rod 12, shown in the preferred embodiment as tubular portion 22, and held in place as an assembly by piston rod nut 13. The number, size (O.D. and I.D.) and thickness of the working disc and preload/adjust disc as well as the size of the bleed passages in the orifice disc can and will vary depending on the specific performance characteristics desired by the end customer for the shock absorber.

It is well known that the piston of a damper is to be constructed of a material that undergoes minimal thermal expansion and contraction. The damper essentially operates by dissipating the energy absorbed from road vibrations by heat generated when the hydraulic fluid in the damper is transferred between compression and rebound chambers 17 and 18 vis-a-vis the valve stacks. Additionally, the wide operating temperature ranges that an automotive vehicle is exposed to significantly affects the viscosity of the hydraulic fluid in turn subjecting the piston and its internal passages to varying pressures and forces. Accordingly, from metallurgical considerations, a tough, hard material exhibiting minimal deflection and minimal thermal expansion and contraction is required. It has been found that powder metals formed into a piston configuration such as by a press and sintered in a furnace provide a good material for the piston. When used herein the expression "sintered metal" piston includes not only a piston formed of powder metals but also metal composites composed of filings or metal particles fused or sintered together into a desired shape. Further "sintered metal" can include such metal compositions that also have minor percentages of non-metallic rigidizing materials such as carbon or graphite fibers or even silicon with carbon or graphite.

Because of the difficulty in machining sintered metal and because the piston is essentially stamped in a die, it has been known to make the piston into two axial halves. The halves can then be pressed together and sintered into a unitary piston or the halves can be individually sintered and glued together or the halves can simply be assembled like a disc stack and held in place as a piston by piston nut 13. This invention uses a sintered metal piston formed of two axially extending halves shown as 15A and 15B in FIG. 1.

This invention uses two identical piston halves 15A, 15B assembled in any manner as described above to form a piston assembly 15, the outer periphery of which receives seal 16. Because the piston halves are identical, only one piston half will be described and new reference numerals will be used in describing the configuration and shape of a piston half 90.

Each piston half 90 has an interior or match face surface shown by reference numeral 91 in FIG. 3 which is a pictorial view of match face surface 91. Each piston also has an exterior face surface designated by reference numeral 92 and best shown by the pictorial representation of this surface in FIG. 4. Exterior face surface 92 is either rebound face surface 60 or compression face surface 61 of piston 15 depending on which side a specific piston half 90 is positioned when assembled onto piston rod 12. Extending axially from exterior face surface 92 is an annular valve seat 93 radially spaced outward from a central hub 94 having a central hub seat 95 which in turn is axially spaced inward from annular valve seat 93. As best shown in FIG. 3 a plurality of ribs 96 extending radially outward from hub 94 form a plurality of circumferentially spaced channels described above as rebound and compression channels 66, 67 respectively. For describing the piston halves (which are identical) the channels will be referred to as outer and inner channels.

Each outer channel extends from an outer surface end opening 97 in exterior face surface 92 which is spaced radially outwardly from valve seat 93. In the preferred embodiment there are six outer channels having outer end openings designated 97A, 97B, 97C through 97F. Outer end openings 97 taper radially inwardly between adjacent ribs 96 to an inner end opening 98 which is trapezoidal in configuration as best shown in FIG. 3. The outer channels in cross section can be viewed as being "L" shaped and an inverted "L" is drawn in FIG. 3 for the outer channel extending between openings 97D and 98D. With respect to the sizing of the channel and the channel openings (for both inner and outer channels) and while generally speaking patent drawings are schematic depictions of the invention, the cross-sectioned valving illustrated in FIG. 1 is generally proportionally correct and generally proportionately to scale. FIG. 1 shows that the channel area in the radial direction i.e. the direction of the "L" shaped configuration, dramatically increases from outer end opening 97 to inner end opening 98 and it is to be recognized that when the two halves are assembled together the inner end opening 98 represents the center of the outer channel. For dimensional considerations, the cross-sectional area of inner end opening 98 is at least twice as large as the cross-sectional area of outer end opening 97.

Inner channels commencing radially inward of valve seat 93 are also formed in each piston half 90. Each inner channel has a face end opening 99 in exterior face surface 92 adjacent to and extending radially inwardly from valve seat 93 and commencing at the base of valve seat 93. In the preferred embodiment the inner channels are six in number and alternate between the outer channels so that there are six face end openings designated 99A, 99B, 99C through 99F as shown in FIG. 3. The inner channels expand radially outward to form match end openings 100 which are trapezoidal in configuration and in fact identical to inner end openings 98 of the outside channels. As with the outer channels, the cross sectional configuration of the inner channels can be viewed as being "L" shaped with an "L" being drawn for a channel having face end opening 99C and match end opening 100C in FIG. 3. When the piston halves are assembled by mating match face surfaces 91 of one piston half with the other, the inner channels of one piston half mate with the outer channels of the opposite piston half to form rebound and compression channels 66, 67 respectively. Specifically, an inside end opening 98 of an inner channel matches with a match end opening 100 of an outer channel to form either a rebound or a compression channel. Importantly, the configuration of each rebound and compression channel is such that from each end opening of each channel the cross sectional area increases in a radially tapering direction to a maximum cross sectional area at the axial center of each channel that is significantly larger than the cross sectional areas of the end openings of each rebound and compression channel.

Test results have indicated that the rebound and compression channel configurations with their associated disc stacks have exhibited extremely good response that correlates well with the design rates at all flows. While not wishing to be necessarily bound by any specific theory that accounts for this performance, it is believed that the firm channel configurations minimize or tend to minimize turbulent flow through the channel and minimize back pressure through the rebound and compression channels. It is believed such variables can exist in other flow passage designs present in conventional pistons which otherwise provide a more torturous or serpentine path. The effect of opening up the channels to provide a free flow path minimizing turbulent flow and back pressure reduces a variable in the design of the shock absorber which is otherwise difficult to account for. That is, fluid flow through piston 15 is now principally accounted for by the spring rates established by the firm compression disc stack 70 and the firm rebound disc stack 80, especially at high flow conditions.

Figure 5:
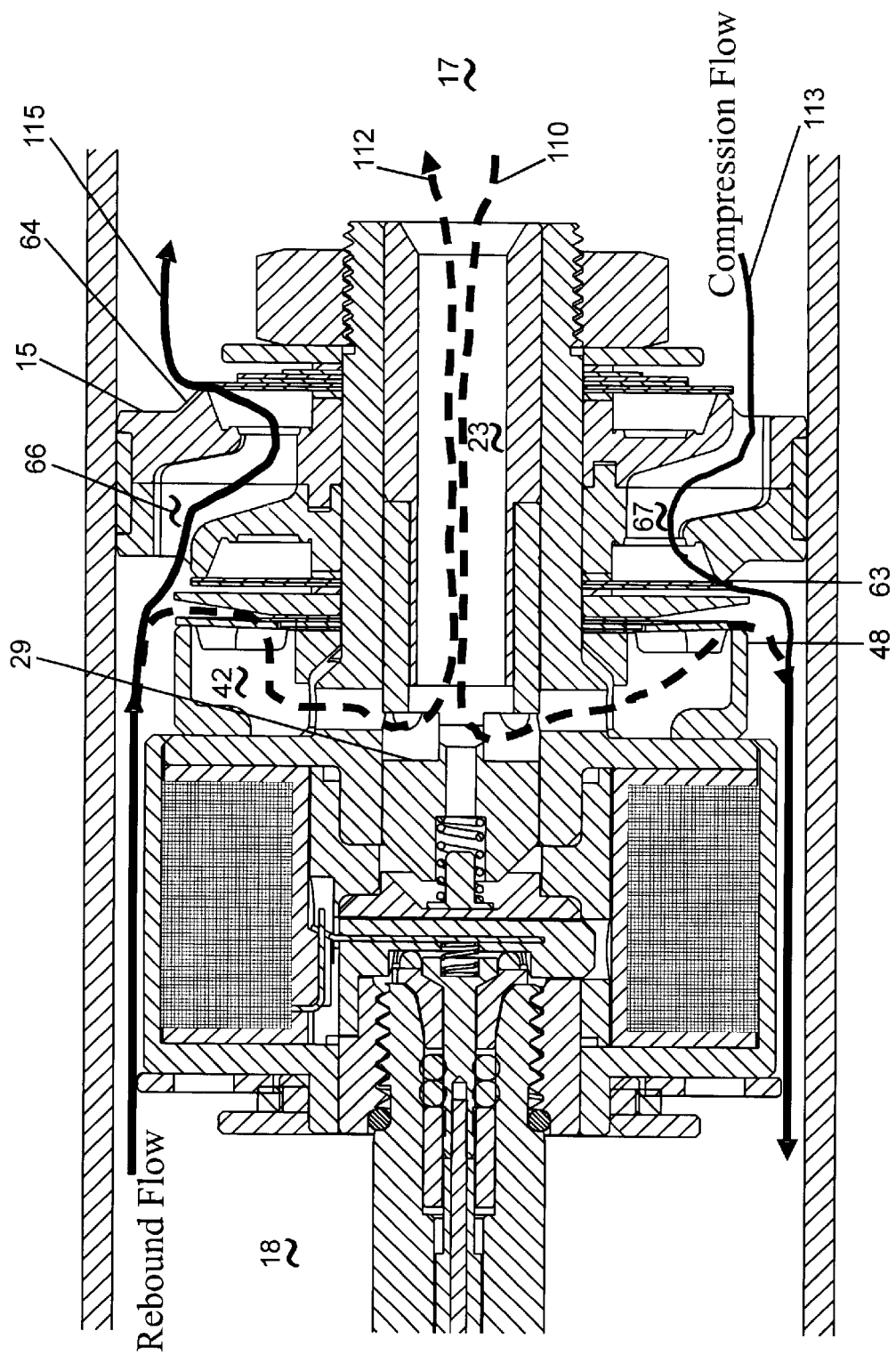

Referring now to FIG. 5 there is shown the fluid flow paths through the disc stack valves in rebound and compression. When shock absorber 10 is in a compression mode, piston 15 moves (relative to tube 11) towards the right as viewed in FIG. 5 towards compression chamber 17 and fluid flows through the valve stacks from compression chamber 17 into rebound chamber 18. Provided that solenoid cylinder valve 29 is in its open position as shown in FIG. 5, fluid will flow from compression chamber 17 through axial rod passage 23, past radial passages 41 and into soft channels 42. When the pressure of the fluid in soft channels 42 exceeds a preset amount soft disc stack 50 will deflect from soft valve seat 48 into rebound chamber 18 and the fluid flow path will be shown by the dashed arrow line designated by reference numeral 110. At the same time or in parallel with soft channel flow 110, fluid in compression channels 67 will pass through the compression valve seat 63 by deflecting compression disc stack 70 when the pressure exceeds a set amount and the path will follow that shown by the solid arrow in FIG. 5 designated by reference numeral 113. When solenoid cylindrical valve 29 is in a closed position fluid can only flow in the path indicated by compression flow arrow 113.

When shock absorber 10 is in a rebound mode, piston 15 moves (relative to tube 11) towards the left in FIG. 5 and fluid must flow from rebound chamber 18 through the valving arrangement into compression chamber 17. With solenoid cylinder valve 29 in the open position as shown in FIG. 5, fluid flows into soft channels 42 by causing deflection of the inner portion of mono tube working disc 53 (to the left as viewed in FIG. 5) and from there fluid travels through axial rod passage 23 into compression chamber 17 along the path shown by dashed line arrow designated by reference numeral 112. At the same time or in parallel, fluid enters rebound channel 66 and passes past rebound valve seat 64 when the pressure in rebound channel 66 is great enough to cause a deflection of firm rebound disc stack 80 towards the right when viewed in FIG. 5 and the rebound flow path will follow that shown by the solid arrow designated by reference numeral 115. When solenoid cylindrical valve 29 is in a closed position fluid can only flow in the path indicated by rebound flow arrow 115. Note that both rebound and compression flow paths 115, 113 have only one undulation of a sine wave. The typical "S" shape is not present.

It should be apparent that mono tube working disc in the soft disc stack 50 is controlling both the compression flow when it deflects at its O.D. and rebound when it deflects at its I.D. Thus the spring rates for compression and rebound through soft disc stack 50 are dependent on one another. They cannot be set independently. By providing separate disc stacks 70 and 80 in piston 15 the rebound and compression rates can be individually tuned because each disc stack operates independently of the other.

In the preferred embodiment and with solenoid cylinder valve 29 in its open position, soft disc stack 50 is set to deflect with less pressure than that required for firm compression disc stack 70 and firm rebound disc stack 80. Thus normal undulations in the road surface are damped through soft disc stack whereas rapid changes in the road surface or hard cornering result in relative movement of piston activating firm compression and rebound disc stacks. In this condition the rapid flow of fluid through all the channels occurs and the open channels provided in piston 15 produce a more responsive valve than other parallel flow arrangements.

Preferably the firm valving is through the piston vis-a-vis the rebound and compression channels described and the soft valving is through the center of the piston rod. However, these functions can be reversed so that soft valving is through the rebound and compression channels and firm valving is occurring through the axial rod passage. Also preferably the invention is used for a mono tube shock absorber or a strut arrangement. However, the invention can be used in a twin tube arrangement providing additional ranges of control for a twin tube damper. Further, the solenoid coil 30 is described as a two position, on-off arrangement. However, the arrangement will function with its firm mode advantage if solenoid coil 30 is a multi-position solenoid.

The invention has been described with reference to a preferred embodiment. Obviously alterations and modifications will occur to those skilled in the art upon reading and understanding the detailed description of the invention. It is intended to cover all such modifications and alterations insofar as they come within the scope of the invention.

Having thus defined the invention, it is claimed:

1. An active hydraulic fluid vehicular suspension damper comprising:

a cylindrical tube shaped to contain a fluid;

a piston rod within and relatively movable to said tube;

a piston affixed to an end of said rod having a circumferentially-extending seal in sliding, sealing contact with said tube to define a compression chamber in said tube extending from one side of said seal and a rebound chamber extending from the opposite side of said seal;

a flux plate affixed to said tube adjacent said piston containing a solenoid and a solenoid valve cylinder movable from a first to a second position relative to said rod when said solenoid is activated;

a valve plate positioned on said rod between said piston and said flux plate; said valve plate having a plurality of soft channels extending therethrough for providing fluid communication between said rebound and compression chamber through said rod, said rod having an axial rod passage extending from an end to a position whereat said valve plate is positioned; each soft channel having a first end opening confronting said rebound chamber and a second end opening adjacent said axial rod passage whereby said soft channels provide fluid communication between said rebound and compression chambers, said solenoid valve cylinder being movable within said axial rod passage between said first and second positions to open and close fluid communication between said soft channels and said axial rod passage;

a soft digressive valve at each first end opening of each soft channel, wherein said soft digressive valve is actuated at a first set pressure when said rod moves in a first direction to allow, when said solenoid valve cylinder permits, fluid communication between said soft channels and said axial rod passage and fluid flow from said compression chamber through said axial rod passage into said rebound chamber, and wherein said soft digressive valve is actuated at a second set pressure when said rod moves in a second direction opposite to said first direction to allow, when said solenoid valve cylinder permits, fluid communication between said soft channels and said axial rod passage and fluid flow from said rebound chamber through said axial rod passage into said compression chamber;

said piston having a plurality of rebound channels and a plurality of compression channels extending therethrough, each rebound channel and compression channel having a rebound end opening to said rebound chamber and a compression end opening to said compression chamber;

a firm digressive rebound valve in valved contact with said compression end opening of said rebound channels allowing valved flow at a set rebound pressure from said rebound chamber through said rebound channels to said compression chamber; and, a firm digressive compression valve in valved contact with said rebound end opening of said compression channels allowing valved flow at a set compression pressure from said compression chamber through said compression channels to said rebound chamber whereby said set pressures of and rate of flow set by said firm digressive compression and firm digressive rebound valves are independent of one another.

2. The damper of claim 1 wherein said piston has a rebound face surface on one side and a compression face surface on an opposite side and a cylindrical rod opening extending therethrough from one face surface to the other, said rebound face surface having an annular compression valve seat extending therefrom, said compression face surface having an annular rebound valve seat extending therefrom, said digressive rebound valve including at least an annular rebound uni-directional working disc and an annular rebound spacer disc, said rebound working disc having an outside diameter greater than the diameter of said rebound valve seat; said digressive compression valve including at least an annular compression uni-directional working disc and an annular compression spacer disc, said annular compression working disc having an outside diameter greater than the diameter of said compression valve seat and all of said working and spacer discs having substantially circular inside diameters and outside diameters whereby said discs can be positioned at any angular orientation relative to said piston rod.

3. The damper of claim 2 wherein:

said digressive compression valve additionally includes a compression orifice disc having a plurality of compression bleed slots extending radially inward from a periphery of said orifice disc to a position inward of said compression valve seat, said compression working disc being located between said valve plate and said compression orifice disc, said digressive compression valve stack further including a compression preload/adjust disc located between said orifice disc and said piston;

said digressive rebound valve additionally includes a rebound orifice disc having a plurality of rebound bleed slots extending radially inward from a periphery of said rebound orifice disc to a position inward of said rebound valve seat, said rebound orifice disc being located between said piston and said rebound working disc, said digressive rebound valve further including a rebound preload/adjust disc between said rebound orifice disc and said piston, and;

said compression orifice disc, said preload/adjust discs and said rebound orifice having substantially circular outside and inside diameters void of aligning notches and protrusions.

4. The damper of claim 3 wherein said valve plate has a valving face surface and a splined central opening extending therethrough for fixing said valve plate at a set angular location on said rod, said valving face surface having a hub seat and an outer annular valve seat therefrom with said first end openings of said soft channels positioned therebetween, said soft valve including a soft bi-directional working disc having an inside diameter greater than the diameter of said hub seat and an outside diameter greater than the diameter of said outer annular valve seat, and at least one soft spacer disc having an outside diameter greater than said inside diameter of said soft working disc, said soft spacer disc having alignment notches formed thereon, and;

an annular clamp/spacer disc between said soft digressive valve and said firm digressive rebound valve, one side of said clamp/spacer disc serving as a stop for deflection of said soft digressive valve and the opposite side of said clamp/spacer disc serving as a stop for deflection of said firm digressive rebound valve.

5. The damper of claim 4 wherein:

said piston being an assembly of first and second substantially identical, sintered metal cylindrical halves, each half having on one side a half face surface comprising one of said rebound or compression face surfaces, a match surface on its opposite side and a rod opening through the center, said match surfaces in contact with one another to form said piston;

each half having i) on its half face surface an annular valve seat protruding therefrom comprising one of said firm rebound valve seats and said annular compression valve seats, ii) a plurality of circumferentially spaced outer channels having in said face surface outer end openings spaced radially outward from said annular valve seat, each outer channel tapering in an "L" shaped configuration from said outer end opening to a trapezoidal inner end opening in said match surface, said inner end opening substantially larger than said outer end opening and radially extending from a position adjacent said rod opening to a position beyond the diameter of said annular valve seat, and iii) a plurality of circumferentially spaced inner channels having face end openings adjacent said half face surface spaced radially inward from said annular valve seat, each inner channel tapering in an "L" shaped configuration from said face end opening to a trapezoidal match end opening in said match surface, said match end opening substantially larger than said face end opening and radially extending from a position adjacent said rod opening to a position beyond the diameter of said annular valve seat whereby said inner channels mate with said outer channels of the opposite half to form one of said rebound channels and said compression channels while said outer channels of said one half mate with the inner channels of said opposite half to form the other one of said rebound and said compression channels, each rebound and compression channel having increasing cross-sectional flow areas from each end opening of each channel.

6. The damper of claim 1 wherein said valve plate has a valving face surface and a splined central opening extending therethrough for fixing said valve plate at a set angular location on said rod, said valving face surface having a hub seat and an outer annular valve seat therefrom with said first end openings of said soft channels positioned therebetween, said soft valve including a soft bi-directional working disc having an inside diameter greater than the diameter of said hub seat and an outside diameter greater than the diameter of said outer annular valve seat, and at least one soft spacer disc having an outside diameter greater than said inside diameter of said soft working disc, said soft spacer disc having alignment notches formed thereon, and;

an annular clamp/spacer disc located between said soft digressive valve and said firm digressive rebound valve, one side of said clamp/spacer disc serving as a stop for deflection of said soft digressive valve and the opposite side of said clamp/spacer disc serving as a stop for deflection of said firm digressive rebound valve.

7. The damper of claim 1 wherein:

said digressive compression valve additionally includes a compression orifice disc having a plurality of compression bleed slots extending radially inward from a periphery of said orifice disc to a position inward of a compression valve seat of said piston, a compression working disc located between said valve plate and said compression orifice disc, and a compression preload/adjust disc located between said compression orifice disc and said piston;

said digressive rebound valve additionally includes a rebound orifice disc having a plurality of rebound bleed slots extending radially inward from a periphery of said rebound orifice disc to a position inward of a rebound valve seat of said piston, a rebound orifice disc located between said piston and said rebound working disc and a rebound preload/adjust disc between said rebound orifice disc and said piston, and;

said compression orifice disc and preload/adjust discs and said rebound orifice discs having substantially circular outside and inside diameters void of aligning notches and protrusions.

8. In an active suspension damper having a cylindrical tube, a piston rod located in and movable relative to the tube and carrying a piston at its end dividing the tube into a rebound chamber on one side of the piston and a compression chamber on an opposite side of said piston, a flux plate on the tube carrying a solenoid for moving a solenoid cylindrical valve into select positions in a central passageway formed in the end of the piston rod and a valve plate between the piston and flux plate having soft channels extending therethrough, each soft channel having an end opening to the central passageway and selectively closed by the solenoid valve and, each soft channel having another end adjacent valve seats contacting a bi-directional soft digressive valve disc for opening the soft channels when the piston axially moves in either rebound or compression and develops pressures beyond a set limit, the improvement comprising:

said piston having a plurality of rebound channels and a plurality of compression channels extending therethrough, each rebound channel and compression channel having a rebound end opening to said rebound channel and a compression end opening to said compression channel;

a firm digressive rebound valve in valved contact with said compression end openings of said rebound channels allowing valved flow at a set rebound pressure from said rebound chamber through said rebound channels to said compression chamber; and, a firm digressive compression valve in valved contact with said rebound end openings of said compression channels allowing valved flow at a set compression pressure from said compression chamber through said compression channels to said rebound chamber whereby said fluid flow through said firm digressive compression and rebound valves are controlled independently of one another.

9. The improvement of claim 8 wherein said piston has a rebound face surface on one side and a compression face surface on an opposite side and a cylindrical rod opening extending therethrough from one face surface to the other, said rebound face surface having an annular compression valve seat extending therefrom, said compression face surface having an annular rebound valve seat extending therefrom, said digressive rebound valve including at least an annular rebound uni-directional working disc and an annular rebound spacer disc, said rebound working disc having an outside diameter greater than the diameter of said rebound valve seat; said digressive compression valve including at least an annular compression uni-directional working disc and an annular compression spacer disc, said annular compression working disc having an outside diameter greater than the diameter of said compression valve seat and all of said working and spacer discs having substantially circular inside diameters and outside diameters whereby said discs can be positioned at any angular orientation relative to said piston rod.

10. The improvement of claim 9 wherein:

said digressive compression valve additionally includes a compression orifice disc having a plurality of compression bleed slots extending radially inward from a periphery of said orifice disc to a position inward of said compression valve seat, said compression working disc being located between said valve plate and said compression orifice disc, said digressive compression valve stack further including a compression preload/adjust disc located between said orifice disc and said piston;

said digressive rebound valve additionally includes a rebound orifice disc having a plurality of rebound bleed slots extending radially inward from a periphery of said rebound orifice disc to a position inward of said rebound valve seat, said rebound orifice disc being located between said piston and said rebound working disc, said digressive rebound valve further including a rebound preload/adjust disc between said rebound orifice disc and said piston, and;

said compression orifice discs and said rebound orifice having substantially circular outside and inside diameters void of aligning notches and protrusions.

11. The improvement of claim 10 wherein said valve plate has a valving face surface and a splined central opening extending therethrough for fixing said valve plate at a set angular location on said rod, said valving face surface having a hub seat and an outer annular valve seat therefrom with said first end openings of said soft channels positioned therebetween, said soft valve including a soft bi-directional working disc having an inside diameter greater than the diameter of said hub seat and an outside diameter greater than the diameter of said outer annular valve seat, and at least one soft spacer disc having an outside diameter greater than said inside diameter of said soft working disc, said soft spacer disc having alignment notches formed thereon, and;

an annular clamp/spacer disc between said soft digressive valve and said firm digressive rebound valve, one side of said clamp/spacer disc serving as a stop for deflection of said soft digressive valve and the opposite side of said clamp/spacer disc serving as a stop for deflection of said firm digressive rebound valve.

12. The improvement of claim 11 wherein:

said piston being an assembly of first and second substantially identical, sintered metal cylindrical halves, each half having on one side a half face surface comprising one of said rebound or compression face surfaces, a match surface on its opposite side and a rod opening through the center, said match surfaces in contact with one another to form said piston;

each half having i) on its half face surface an annular valve seat protruding therefrom comprising one of said firm rebound valve seats and said annular compression valve seats, ii) a plurality of circumferentially spaced outer channels having in said face surface outer end openings spaced radially outward from said annular valve seat, each outer channel tapering in an "L" shaped configuration from said outer end opening to a trapezoidal inner end opening in said match surface, said inner end opening substantially larger than said outer end opening and radially extending from a position adjacent said rod opening to a position beyond the diameter of said annular valve seat, and iii) a plurality of circumferentially spaced inner channels having face end openings adjacent said half face surface spaced radially inward from said annular valve seat, each inner channel tapering in an "L" shaped configuration from said face end opening to a trapezoidal match end opening in said match surface, said match end opening substantially larger than said face end opening and radially extending from a position adjacent said rod opening to a position beyond the diameter of said annular valve seat whereby said inner channels mate with said outer channels of the opposite half to form one of said rebound channels and said compression channels while said outer channels of said one half mate with the inner channels of said opposite half to form the other one of said rebound and said compression channels, each rebound and compression channel having increasing cross-sectional flow areas from each end opening of each channel.

13. A damper comprising:

a cylinder;

a piston rod disposed in said cylinder, said piston rod having an axial rod passage formed therein, at least one of said rod and cylinder being movable relative to the other;

a piston affixed to said rod and dividing said cylinder into a compression chamber and a rebound chamber, said piston having at least one firm rebound channel and at least one firm compression channel extending therethrough, said at least one rebound channel including an outlet and said at least one compression channel including an outlet;

a uni-directional rebound working disc in valved contact with the outlet of said at least one rebound channel;

a uni-directional compression working disc in valved contact with the outlet of said at least one compression channel;

a valve plate located on said rod and having at least one soft channel;

a actuable valve located in said axial rod passage and being movable to selectively allow or block flow of said fluid between said rebound and compression chambers through said at least one soft channel whereby valved parallel flow through said valve plate and said piston occurs when said actuable valve allows flow through said soft channels while said uni-directional rebound working disc and said uni-directional compression working disc independently control flow at all times through said firm rebound and compression channels.

14. The damper of claim 13 wherein said piston has a rebound face surface on one side and a compression face surface on an opposite side and a cylindrical rod opening extending therethrough from one face surface to the other, said rebound face surface having an annular compression valve seat extending therefrom, said compression face surface having an annular rebound valve seat extending therefrom, said digressive rebound valve including at least an annular rebound uni-directional working disc and an annular rebound spacer disc, said rebound working disc having an outside diameter greater than the diameter of said rebound valve seat; said digressive compression valve including at least an annular compression uni-directional working disc and an annular compression spacer disc, said annular compression working disc having an outside diameter greater than the diameter of said compression valve seat and all of said working and spacer discs having substantially circular inside diameters and outside diameters whereby said discs can be positioned at any angular orientation relative to said piston rod.

15. The damper of claim 14 wherein:

said digressive compression valve additionally includes a compression orifice disc having a plurality of compression bleed slots extending radially inward from a periphery of said orifice disc to a position inward of said compression valve seat, said compression working disc being located between said valve plate and said compression orifice disc, said digressive compression valve stack further including a compression preload/adjust disc located between said orifice disc and said piston;

said digressive rebound valve additionally includes a rebound orifice disc having a plurality of rebound bleed slots extending radially inward from a periphery of said rebound orifice disc to a position inward of said rebound valve seat, said rebound orifice disc being located between said piston and said rebound working disc, said digressive rebound valve further including a rebound preload/adjust disc between said rebound orifice disc and said piston, and;

said compression orifice disc, said preload/adjust discs and said rebound orifice having substantially circular outside and inside diameters void of aligning notches and protrusions.

16. The damper of claim 15 wherein said valve plate has a valving face surface and a splined central opening extending therethrough for fixing said valve plate at a set angular location on said rod, said valving face surface having a hub seat and an outer annular valve seat therefrom with said first end openings of said soft channels positioned therebetween, said soft valve including a soft bi-directional working disc having an inside diameter greater than the diameter of said hub seat and an outside diameter greater than the diameter of said outer annular valve seat, and at least one soft spacer disc having an outside diameter greater than said inside diameter of said soft working disc, said soft spacer disc having alignment notches formed thereon, and;

an annular clamp/spacer disc between said soft digressive valve and said firm digressive rebound valve, one side of said clamp/spacer disc serving as a stop for deflection of said soft digressive valve and the opposite side of said clamp/spacer disc serving as a stop for deflection of said firm digressive rebound valve.

17. The damper of claim 16 wherein:

said piston being an assembly of first and second substantially identical, sintered metal cylindrical halves, each half having on one side a half face surface comprising one of said rebound or compression face surfaces, a match surface on its opposite side and a rod opening through the center, said match surfaces in contact with one another to form said piston;

each half having i) on its half face surface an annular valve seat protruding therefrom comprising one of said firm rebound valve seats and said annular compression valve seats, ii) a plurality of circumferentially spaced outer channels having in said face surface outer end openings spaced radially outward from said annular valve seat, each outer channel tapering in an "L" shaped configuration from said outer end opening to a trapezoidal inner end opening in said match surface, said inner end opening substantially larger than said outer end opening and radially extending from a position adjacent said rod opening to a position beyond the diameter of said annular valve seat, and iii) a plurality of circumferentially spaced inner channels having face end openings adjacent said half face surface spaced radially inward from said annular valve seat, each inner channel tapering in an "L" shaped configuration from said face end opening to a trapezoidal match end opening in said match surface, said match end opening substantially larger than said face end opening and radially extending from a position adjacent said rod opening to a position beyond the diameter of said annular valve seat whereby said inner channels mate with said outer channels of the opposite half to form one of said rebound channels and said compression channels while said outer channels of said one half mate with the inner channels of said opposite half to form the other one of said rebound and said compression channels, each rebound and compression channel having increasing cross-sectional flow areas from each end opening of each channel.

18. A damper comprising:

a cylinder arranged to receive a damping fluid therein, said cylinder having an inner chamber;

a piston located inside and movable relative to said cylinder, said piston generally sealingly engaging an inner wall of said cylinder to divide said inner chamber into a rebound chamber located on a first side of said piston and a compression chamber located on a second side of said piston opposite said first side, said piston having at least one valved rebound channel and at least one valved compression channel extending therethrough, said at least one valved rebound channel being configured to selectively allow fluid to flow from said rebound chamber to said compression chamber therethrough, but generally blocking the flow of fluid from said compression chamber to said rebound chamber therethrough, said at least one valved compression channel being configured to selectively allow fluid to flow from said compression chamber to said rebound chamber therethrough, but generally blocking the flow of fluid from said rebound chamber to said compression chamber; and an actuable valve located in said cylinder, said valve being movable between an actuated state wherein said actuable valve selectively allows bidirectional fluid flow between said rebound chamber and said compression chamber, and a non-actuated state wherein said actuable valve generally blocks any fluid flow between said rebound chamber and said compression chamber.

19. The damper of claim 18 wherein said at least one valved rebound channel allows fluid to flow from said rebound chamber to said compression chamber when there is a sufficient pressure differential between said rebound chamber and said compression chamber, and generally blocks fluid flow from said rebound chamber to said compression chamber when there is not a sufficient pressure differential between said rebound chamber and said compression chamber, and wherein said at least one valved compression channel allows fluid to flow from said compression chamber to said rebound chamber when there is a sufficient pressure differential between said compression chamber and said rebound chamber, and generally blocks fluid flow from said compression chamber to said rebound chamber when there is not a sufficient pressure differential between said compression chamber and said rebound chamber.

20. The damper of claim 19 wherein said pressure differential required to cause said at least one valved rebound channel to allow flow is determined by said at least one valved rebound channel, and is independent of said pressure required to cause said at least one valved compression chamber to allow flow.

21. The damper of claim 18 wherein said piston includes a plurality of valved rebound channels and valved compression channels extending therethrough, and wherein said actuable valve is movable with said piston.

22. The damper of claim 18 wherein each of said valved rebound channels and said valved compression channels includes a disc biased against a valve seat, and wherein at least part of each disc can be moved away from its associated valve seat to allow fluid to flow therethrough when there is a sufficient pressure differential across the disc.

23. The damper of claim 18 wherein said at least one valved rebound channel is discreet and spaced apart from said at least one valved compression channel.

24. The damper of claim 18 wherein said at least one valved rebound channel and said at least one valved compression channel independently control the flow of fluid therethrough.

25. The damper of claim 18 further including a solenoid operatively coupled to said actuable valve, wherein said solenoid controls movement of said actuable valve between said actuated and non-actuated states.

26. The damper of claim 18 wherein said actuable valve includes a passage connecting said compression and rebound chambers, and a disc seated on an actuable valve seat to selectively allow or block fluid flow through said passage when said actuable valve is in said actuated state.

27. The damper of claim 26 wherein at least part of said disc is deflectable away from said actuable valve seat in a first direction when a pressure differential of a first direction and magnitude exists across said actuable valve, and at least part of said disc is deflectable away from said actuable valve seat in a second direction opposite to said first direction when a pressure differential of a second direction and magnitude exist across said actuable valve.

28. The damper of claim 26 further including a rod extending through at least one end of said cylinder and coupled to said piston such that said rod is movable with said piston relative to said cylinder, and wherein at least part of said passage is located in said rod.

* * * * *